(12) United States Patent
Furtwangler et al.

(10) Patent No.: US 11,488,340 B2
(45) Date of Patent: Nov. 1, 2022

(54) CONFIGURABLE STYLIZED TRANSITIONS BETWEEN USER INTERFACE ELEMENT STATES

(71) Applicant: Home Box Office, Inc., New York, NY (US)

(72) Inventors: Steven N. Furtwangler, Okemos, MI (US); Brendan Joseph Clark, Seattle, WA (US); Brandon C. Furtwangler, Issaquah, WA (US); J. Jordan C. Parker, Seattle, WA (US); Nathan J. E. Furtwangler, Kirkland, WA (US)

(73) Assignee: HOME BOX OFFICE, INC., New York, NY (US)

(*) Notice: Subject to any disclaimer, the term of this patent is extended or adjusted under 35 U.S.C. 154(b) by 0 days.

(21) Appl. No.: 17/120,894

(22) Filed: Dec. 14, 2020

(65) Prior Publication Data

US 2021/0097748 A1 Apr. 1, 2021

Related U.S. Application Data

(63) Continuation of application No. 16/198,309, filed on Nov. 21, 2018, now Pat. No. 10,885,695, which is a continuation of application No. 14/841,622, filed on Aug. 31, 2015, now abandoned.

(60) Provisional application No. 62/046,102, filed on Sep. 4, 2014.

(51) Int. Cl.
*G06F 3/0484* (2022.01)
*G06T 13/80* (2011.01)
*G06F 9/451* (2018.01)

(52) U.S. Cl.
CPC ............ *G06T 13/80* (2013.01); *G06F 3/0484* (2013.01); *G06F 9/451* (2018.02)

(58) Field of Classification Search
CPC ........ G06T 13/80; G06F 9/451; G06F 3/0484
See application file for complete search history.

(56) References Cited

U.S. PATENT DOCUMENTS

| 7,350,151 | B1 | 3/2008 | Nakajima |
| 8,516,385 | B1 | 8/2013 | Eismann et al. |
| 2002/0180784 | A1 | 12/2002 | Broussard |

(Continued)

FOREIGN PATENT DOCUMENTS

EP   2 584 445 A1   4/2013

OTHER PUBLICATIONS

International Search Report and Written opinion from International Patent Application Serial No. PCT/US15/47911, dated Dec. 8, 2015, 13 pages.

(Continued)

*Primary Examiner* — Jennifer N Welch
*Assistant Examiner* — K C Chen
(74) *Attorney, Agent, or Firm* — Amin, Turocy & Watson, LLP

(57) ABSTRACT

Determining the rendering of user interface (UI) elements, referred to as views, based upon styleable transitions between possible states of a view. Transitions may include animation, such as to smoothly enter a view into or exit a view out of a scene over a number of rendering frames. Transitions also may be applied to view state changes related to a UI element, such as to indicate hovered over, focused, listening (for speech), selected and/or pressed. View state changes also may be animated.

20 Claims, 12 Drawing Sheets

(56) References Cited

U.S. PATENT DOCUMENTS

| | | | |
|---|---|---|---|
| 2003/0052919 A1 | 3/2003 | Tlaskal et al. | |
| 2003/0090506 A1 | 5/2003 | Moore et al. | |
| 2006/0259869 A1 | 11/2006 | Hewitt et al. | |
| 2006/0265659 A1* | 11/2006 | Collins | G06F 40/103 715/732 |
| 2009/0102806 A1* | 4/2009 | Tomkins | G06F 3/04883 345/173 |
| 2009/0150813 A1* | 6/2009 | Chang | G06F 3/0481 715/764 |
| 2009/0189915 A1 | 7/2009 | Mercer et al. | |
| 2009/0219294 A1 | 9/2009 | Young et al. | |
| 2009/0313578 A1 | 12/2009 | Roh et al. | |
| 2010/0287147 A1 | 11/2010 | Werkander et al. | |
| 2012/0206391 A1 | 8/2012 | Kim et al. | |
| 2012/0262462 A1* | 10/2012 | Montan | G06F 3/0488 345/473 |
| 2013/0057555 A1* | 3/2013 | Huang | G06T 13/80 345/473 |
| 2014/0047393 A1 | 2/2014 | Steele et al. | |
| 2014/0123021 A1* | 5/2014 | Walkin | G06F 3/04883 715/746 |
| 2014/0223274 A1 | 8/2014 | Nakamura | |
| 2014/0267380 A1 | 9/2014 | Letts et al. | |
| 2015/0067582 A1 | 3/2015 | Donnelly et al. | |
| 2015/0113407 A1 | 4/2015 | Hoffert et al. | |
| 2015/0310043 A1* | 10/2015 | Adelman | G06F 16/21 705/14.41 |
| 2015/0332107 A1* | 11/2015 | Paniaras | G06F 3/167 715/765 |

OTHER PUBLICATIONS

Pulo, Kevin., "Navani: Navigating Large-Scale Visualisations with Animated Transitions", 11th International Conference Information Visualization (IV'07)0-7695-2900-3/07 $20.00 © 2007 IEEE, 6 pages.

Non-Final Office Action received for U.S. Appl. No. 14/841,622, dated Jan. 23, 2018, 51 pages.

Final Office Action received for U.S. Appl. No. 14/841,622, dated Jul. 19, 2018, 61 pages.

Non-Final Office Action received for U.S. Appl. No. 16/198,309 dated Mar. 12, 2020 37 pages.

Notice of Allowance received for U.S. Appl. No. 16/198,309 dated Sep. 1, 2020, 24 pages.

\* cited by examiner

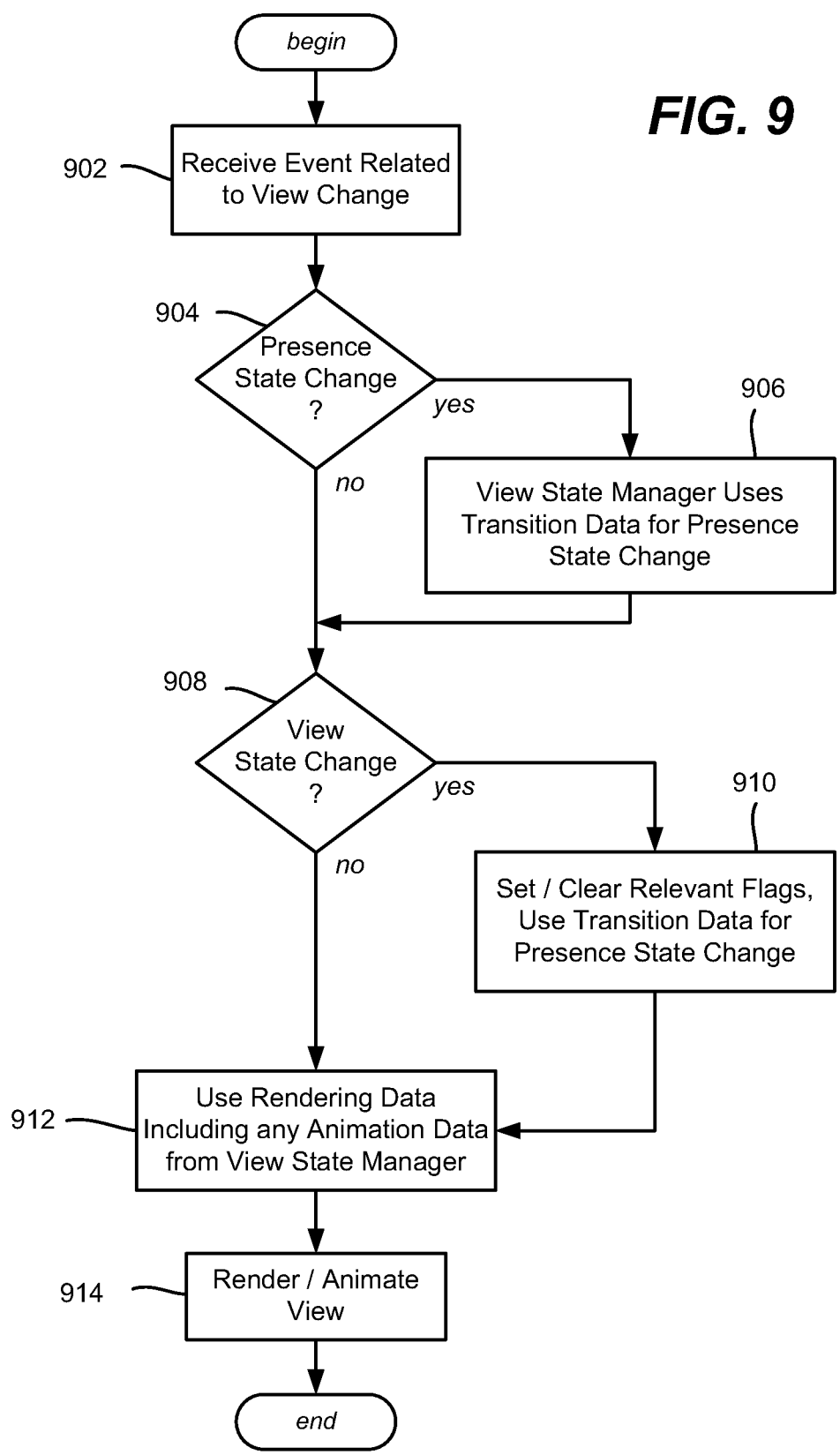

CONFIGURABLE STYLIZED TRANSITIONS BETWEEN USER INTERFACE ELEMENT STATES

CROSS-REFERENCE TO RELATED APPLICATION

This application is a continuation of, and claims priority to U.S. patent application Ser. No. 16/198,309 filed on Nov. 21, 2018, which claims priority to U.S. patent application Ser. No. 14/841,622, filed on Aug. 31, 2015, which claims the benefit of U.S. provisional patent application Ser. No. 62/046,102, filed Sep. 4, 2014. The entireties of the aforementioned applications are hereby incorporated herein by reference.

BACKGROUND

A user interface (UI) of a computer program, to be considered favorably by end users, needs to be appealing, straightforward to use and consistent in its operation. One of the ways to make a UI straightforward to use is by using various mechanisms to guide the user in knowing where he or she is operating with respect to the UI. A typical UI example is to highlight the currently focused UI element, so that the user knows that further interaction with that element (e.g., a click, tap, double-click, typing the "Enter" keyboard key and so on) will cause some action related to that particular element to be taken.

In certain situations, the sudden change of an element from one UI state to another can be less than appealing. For example, consider that a UI element that receives focus has its position changed so that it is indented relative to non-focused elements. A sudden jump to the new indented position (possibly in conjunction a jump back by a previously focused element so as to no longer be indented) can seem unnatural and visually unappealing.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards stylized transitions that determine how transitions between user interface (UI) states are rendered. Stylized transitions allow a program developer to control transitions between UI states. This may include animating the transition, to provide effects such as smooth entering and exiting of a UI element. This also may include repositioning, resizing, reorienting, changing color, changing opacity, and so on, each of which also may be animated.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which:

FIG. 9 is a flow diagram showing example steps related to communicating a view's presence state and/or view state information for styleable transition rendering, according to one or more example implementations.

DETAILED DESCRIPTION

Figure 1:
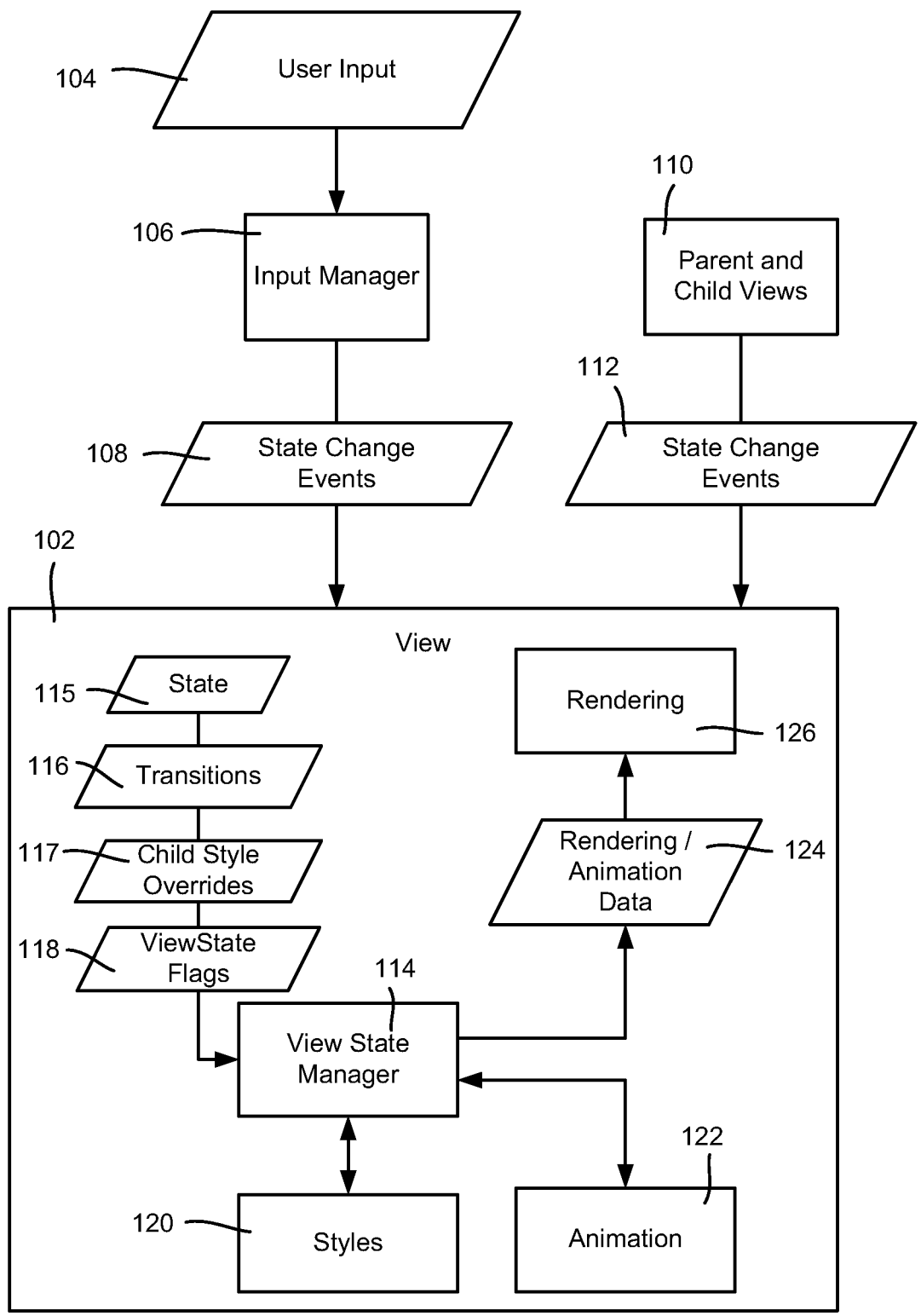
FIG. 1 is block diagram showing various example components for implementing styleable transitions, according to one or more example implementations.

Various aspects of the technology described herein are generally directed towards a user interface (UI) technology that provides the ability to use stylized transitions between UI "presence" states. Example presence states related to state transitions include disconnected, in which a view (a UI element) is not in a visual tree (at least not yet), and connected, in which a view (a UI element) is in the visual tree but is not visible to the user, that is, is not yet in the scene. Other transitioning-related states include entering, in which a view is being transitioned into the scene, and exiting, in which a view is being transitioned out of the scene. Note that out of a scene may be alternatively referred to herein as "off screen," and in a scene may be alternatively referred to herein as "on screen."

Each view can be styled with a set of transitions, including transitions related to the entering or exiting presence states. These transitions are described as a desired state in which to be while in the given presence state. For example, a UI element may be styled to initially be off-screen (e.g., to the left), but to be on-screen (moving to the center) in the entering state, and off-screen again (this time moving to the right) in the exiting state. Transitions are applied immediately if the view is disconnected from the visual tree, so in the above example, the view is immediately created out of the scene, e.g., to the left of it. However, upon entering the visual tree and transitioning to the entering presence state, the entering transition style is applied, whereby the view animates onto the screen (from the left) until it reaches its desired location in the center of the screen. When the state is changed, e.g., the user leaves the page, the view transitions to the exiting presence state, whereby the UI element animates off-screen, e.g., moving from the center to the right until out of the scene. The animation may, for example, include starting and ending positions and an animation time, so that the rendering position may be computed for each rendering frame or the like.

It should be understood that any of the examples herein are non-limiting. For instance, transitions related to movement/repositioning animations of a UI element are exemplified herein, however animations are not related solely to movement, but include concepts such as changing size, color, orientation, opacity and so on. As one example, instead of transitioning an element from left to right when in the entering state, an element may have its opacity gradually changed so that a transparent element transitions into a solid element, and when later in the exiting state, has its opacity gradually changed back to fade away the element. Any transition effects may be combined, e.g., an entering view may be animated to grow as it is also animated to move from off screen left to the center of the scene (e.g., left to right), and upon exiting shrink as it moves out of the scene (e.g., from the center to off screen right).

Further, any of the logic and the like may be implemented in software, hardware or a combination thereof. Still further, an entertainment/game console is one example computing environment, however any other suitable computer-based device such as a personal computer, tablet device, mobile computer device and the like may implement the technology described herein.

As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and user interface concepts in general.

In one or more implementations, UI elements that are configured (e.g., as objects) to participate in styleable transitions (alternatively referred to herein as views) may possess a presence state. Views are initially in the "disconnected" (not in the visual tree) state, except for the root view of the visual tree, which is initially in the "entering" state. As set forth above, other states include "connected," in which the view is in the visual tree, but is not yet entering the scene, "entering," in which the view is entering the scene and "exiting," in which the view is exiting the scene.

When views become children of other views in the visual tree, they inherit their parent's presence. Whenever a view's presence is updated, that presence is applied to its children in the visual tree. Thus, for example, consider a UI element such as an item container with child UI elements such as interactive tiles. If that container is transitioned to enter into a scene, its children are likewise in the entering state. When a view is removed from the visual tree its presence reverts to the "disconnected" state (as well as any children).

FIG. 1 shows example components related to styleable transitions. In FIG. 1, a user interacts with a view 102 via user input 104. In one or more implementations, an input manager 106 comprising an object handles input in the form of keyboard input, pointer (e.g., touch and/or mouse) input, speech input, gesture input and/or the like (including non-traditional input such as based on eye gaze detection, brain sensing and the like).

In general, the input manager 106 processes the user input 104 to the extent expected by the view 102 and provides corresponding events to the view 102, including state change events 108. For example, keyboard events are provided to the view 102, any speech input and gesture input may be converted to commands that are sent to the view, and so on.

In this way, based upon user interaction, a view (and any child views) may change presences states. However, a view may not need direct interaction to change states; as is understood, for example, a view in the connected state is not in the scene and thus cannot be interacted with, yet transitions to the entering state as a result of some event. Such other state changes may be caused by user interaction with a parent view or child view, for example, and thus act as another type of transition triggering event, as represented in FIG. 1 via blocks 110 and 112. Timing is another such event that also may cause a view state change, e.g., a "Home" page at program startup may have some of its elements transitioned into the Home page even without any user interaction, a "Help" button may be animated into a scene if the user appears confused by not taking any action for awhile, and so on.

Figure 2A:
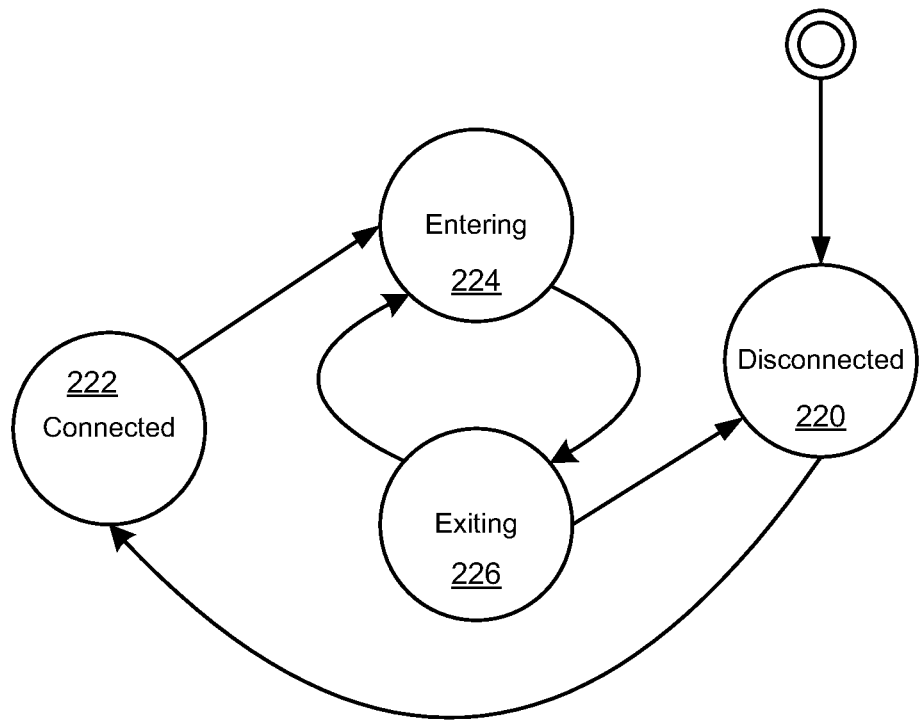
FIG. 2A is a state diagram showing example presence states of a UI element (view) and state changes between those presence states, according to one or more example implementations.
Figure 2B:
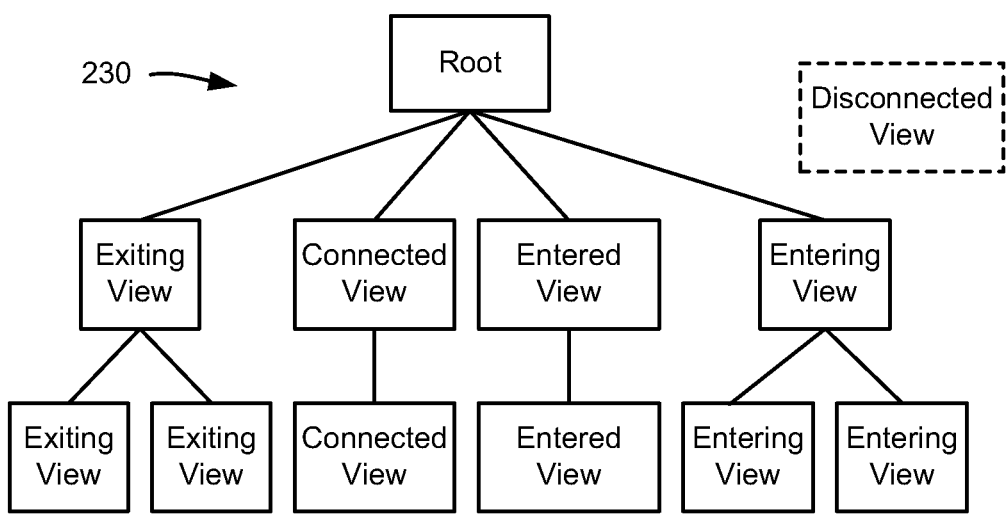
FIG. 2B is a representation of an example visual tree state showing views in various states in the visual tree, along with a disconnected view that is not in the visual tree, according to one or more example implementations.

FIG. 2A is a state diagram showing states related to transitioning views. Views are initially in the disconnected presence state 220, indicating that they are not yet connected (or are no longer connected) to the visual tree 230 (FIG. 2B). Upon being connected to the visual tree, a view will transition to the connected state 222. From there, a view may transition to the entering state 224 and from the entering state to the exiting state 226. From the exiting state 226, a view may transition to the entering state again, or may become disconnected if it is removed from the visual tree.

In one or more implementations, no animations are performed when the view is not connected to the visual tree (or when it is connected but not entered); (notwithstanding, a view in the connected state may be prepared and buffered for rendering, e.g., an image associated therewith pre-fetched from the network in advance of its display, which may include some styling). In general, only the entering and exiting states have transitions that can be styled. Note that FIG. 2B has an "entered view" state that is not related to any further transition, but rather refers to when a view has finished the "entering" animation and is waiting for some further event that changes its presence state to exiting. Such a waiting state may be considered part of the entering state 224.

Figure 3:
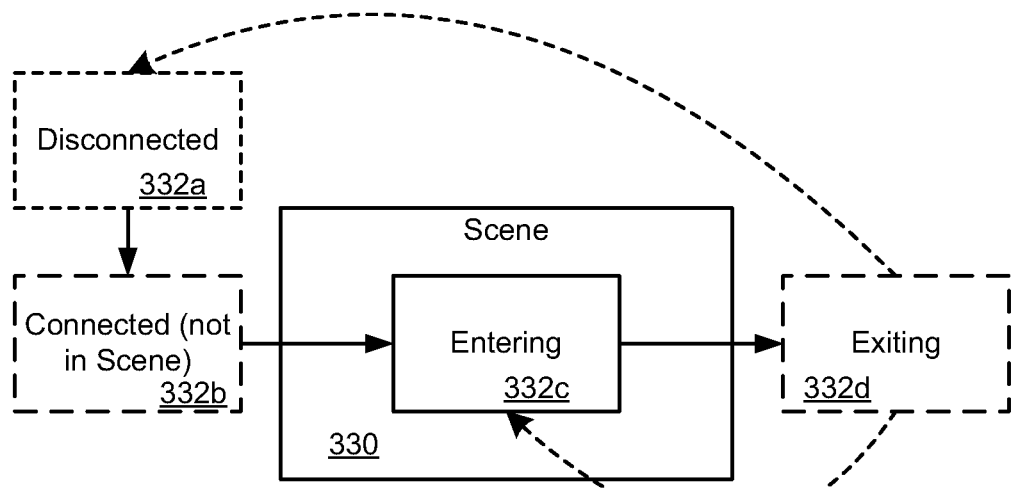
FIG. 3 is a representation of how a view may change states relative to a scene/parent view, according to one or more example implementations.

Presences states are alternatively shown in FIG. 3, where a scene 330 (which may be a parent view) includes a child view (UI element) that transitions from the disconnected state 332*a* to the connected state 332*b* and then to the entering state 332*c*. After an event, the child view transitions to the exiting state 332*d*. From there, as represented by the curved and dashed arrows, the child view may be returned to the disconnected state 332*a* or be returned to the entering state (possibly animated to re-enter from the opposite direction so as to appear to be coming back from where it exited).

Returning to FIG. 1, when a view state changes, the state change is handled by a view state manager 114, e.g., comprising part of the view's logic/code. In general, in addition to the typical input handling methods and rendering code, any view may participate in styleable transitions by including a view state manager 114 as part of its logic. As can be readily appreciated, it is alternatively feasible to have a view communicate with an external view state manager.

The view state manager 114 tracks the current state 115 and also may include a set of transitions 116 for the view's presence states, e.g., information on what to do with respect to entering, exiting and so forth. Further, a parent view can specify a set of transitions to apply on its children (comprising child style overrides 117 that override any child's styled transitions). This allows a container view to control how its children enter and exit, for example.

Note that a higher-level parent container can also contain a lower-level parent container that has children and so on. The overrides from the higher-level parent container may supersede those of the lower-level parent container in the event of a conflict. However, it is alternatively feasible to only use the overrides of a direct parent. Still further, a mechanism that instructs the view state manager on what to do on a container-by-container basis may be used, e.g., use the settings of direct parent (container A) for transitioning the children of container A without any higher overwriting, overwrite any conflicting settings of direct parent container C with those of a higher parent (container D) for transitioning the children of container C, and so on.

If a view does not specify a particular piece of information, e.g., color, the view state manager can use information from a set of default styles 120 so that, for example, the UI can maintain a certain theme such as a color scheme without the developer having to program each element with all possible style properties. Note that default styles may be inherited by a view object, in which event the default styles are already present in the view.

The view state manager 114 also maintains data (e.g., via a set of Boolean flags) comprising additional information regarding the current interactive state of the view. More particularly, the UI elements (views) additionally support a number of ViewState flags 118, including, but not limited to:

Focused—The view is focused within its input scope
Hovered—The view has pointer input directly over it
Listening—The view is listening for command input such as voice input
Selected—The view is active/invoked/toggled on
Pressed—The view has either a pointer captured, or has the invoke button pressed.

Figure 4:
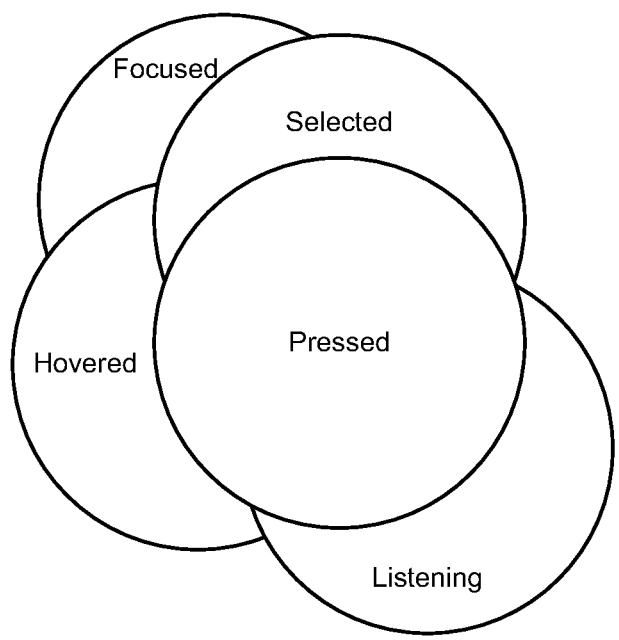
FIG. 4 is a representation of example possible view states, according to one or more example implementations.

Unlike the (mutually exclusive) presence states described above, more than one of these flags may be set at once, e.g., they may overlap as in FIG. 4. For example, one UI element (view) may be Hovered (because the mouse cursor is over it) but not Pressed, whereas another view may be Focused and Pressed.

Like the presence states above, these view states may be styled with transitions describing the desired state of the UI element when that flag is true. For example, once a view comprising a menu item is on screen, the UI developer may want the text color to be green when the item is listening for voice input (overriding whatever text color the menu uses by default). Similarly, the UI developer may want to reposition an element slightly to the right when it is Hovered or Focused (the style specifies an X offset of some margin), and to move down slightly when Pressed (the style specifies a Y offset of some margin). Note however that transitions styled for the view's current view state flags are applied (in order), whereby some of the transitions defined by earlier steps may be overwritten; e.g., the Focused style may specify blue font text, while the Pressed style may specify red font text, whereby if the Focus styleable transition is applied earlier in the order than the Pressed styleable transition, red text overwrites the blue text setting when both Focused and Pressed.

It should be noted that "transitions" may be, but need not be, animated. In the above example, the red font text for the Pressed style may simply be used as is, that is, changed right away without any animated transitioning from another color over time; (color changes may be animated if desired, though).

Also note that only changed/currently relevant information needs to be processed by the view state manager. For example, only the ViewState flags may be accessed and processed if the view state manager already has any child style override data for the child's parent container.

Figure 5A:
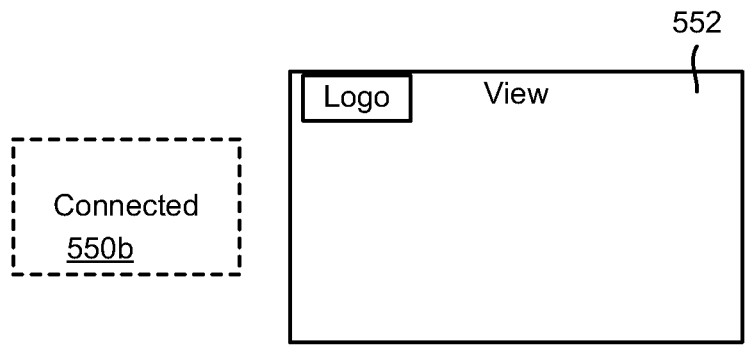
FIGS. 5A-5F are example "snapshot" representations showing a view changing states over time, including being animated to enter a scene and later exit the scene, according to one or more example implementations.
Figure 5B:
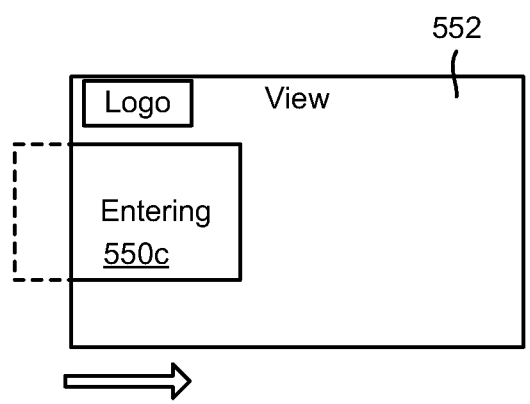
Figure 5C:
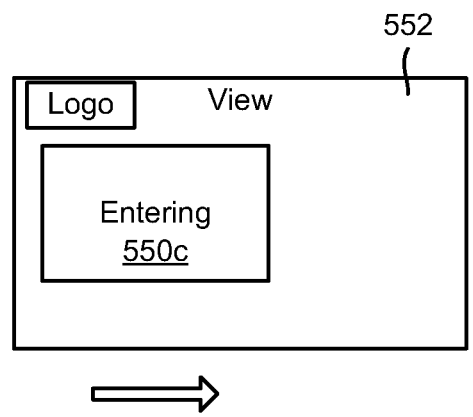
Figure 5D:
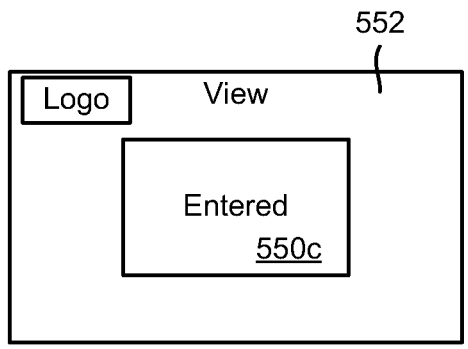

FIGS. 5A-5F are example representations of animated movement of an element (child view) entering and exiting a parent view 552 at various "snapshot" times. As is represented, the child view 550b is originally in the connected state (FIG. 5A), and transitions to the entering state, which has a stylized transition that includes animating the child view 550c into the scene from left to right (FIGS. 5B and 5C). Animation continues, until the child view 550c settles into a centered "Entered" position (FIG. 5D), which as set forth above may be still considered to be in the entering presence state. Note that a "Logo" image element or the like appears in a fixed position in the parent view 552 to emphasize that the element 550c is moving over the snapshotted frames of FIGS. 5A-5C and 5E, and it is not the parent view 552 that the user perceives as moving.

Figure 5E:
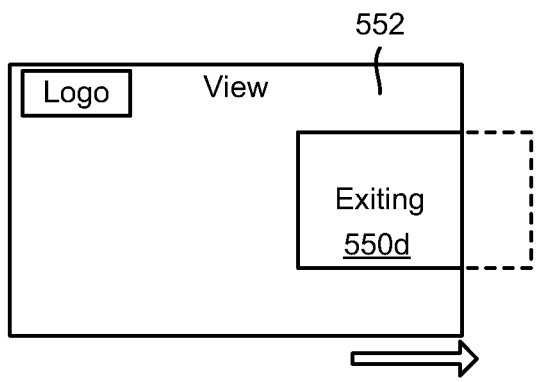
Figure 5F:
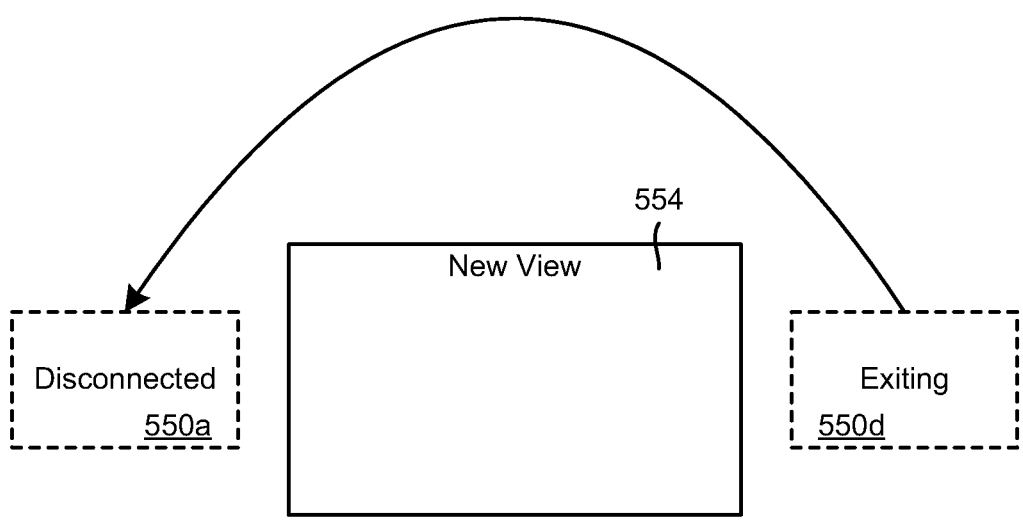

Upon some event, the child view 550c changes to the exiting state (child view 550d), moving out of the scene to the right as represented in FIG. 5E. For example, the parent view 552 may be changed to a new page view 554 as in FIG. 5F, causing the exiting transition as well as the transition to the disconnected state for that parent view 552, and thus the child view 550a.

Whenever the state of the UI element changes, the view state manager 114 re-computes which transitions apply. The view begins with those transitions described by its presence, which may then be overridden by the parent view (e.g., if this view is part of a container that wants its children to transition on and off screen in some coordinated way). The transition set may be further overridden (or augmented) by any view state flags that are set.

When recalculating the set of transitions that apply to a view's current state, the view state manager 114 begins with those transitions styled for the view's current presence. Then, transitions styled for the view's current view state flags are applied (in order), potentially overwriting some of the transitions defined by earlier actions. The resulting set of transitions are then turned into animations, e.g., as represented by block 122 of FIG. 1; if the current values are not the same as the desired values, the animations to transition from the current values to the desired values are initiated. Rendering data 124 (including any animation data) is used by a rendering mechanism (e.g., a code/logic portion) 126 of the view, whereby the view renders itself, including any animation over time. Note that as used herein, "render" in any of its tenses or variants (e.g., rendered, rendering) in addition to visible output may include audio output, tactile output and virtually any other output that can be sensed by a user.

Figure 6A:
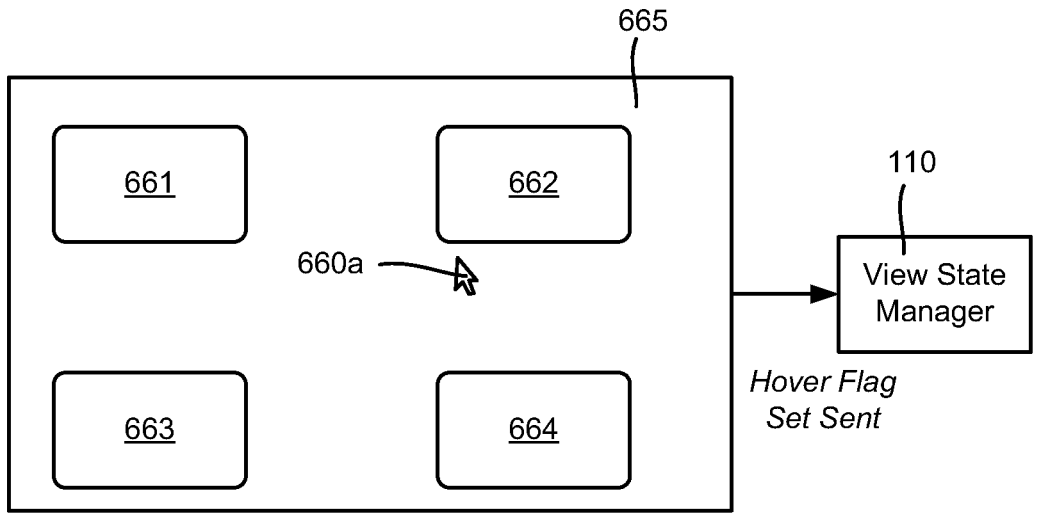
FIGS. 6A and 6B are example representations showing a view changing a view state to indicate a hovered condition, according to one or more example implementations.
Figure 6B:
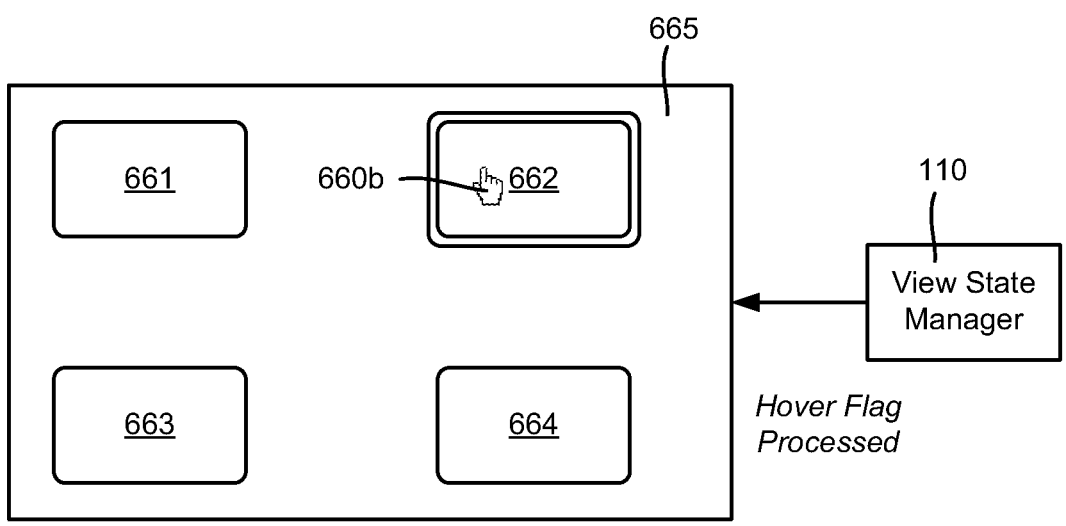

FIGS. 6A and 6B show an example of the hover flag operation. In FIG. 6A, a mouse cursor 660a (appearing as an arrow-shaped pointer) is not hovering over any of the child view elements 661-664 (children of a parent view, container 665). In FIG. 6B, the mouse cursor 660b (also changed in appearance to a pointing finger) is moved and now hovers over the child element 662. The child element 662 hovered state results in a change to the ViewState flags (with the hover flag set) processed by the view state manager 114, which then uses a stylized transition for hover (e.g., provided by the child element 662 or possibly as overridden by the parent container 665). In this example, the child element's appearance is changed as specified, e.g., an outlined rectangle represents the hovered-over element in FIG. 6B instead of a single non-outlined rectangle as in FIG. 6A.

Figure 7A:
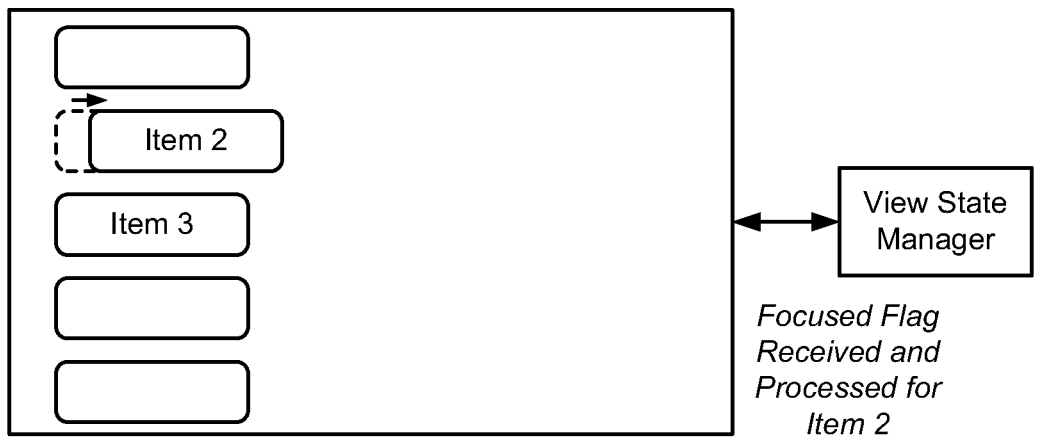
FIGS. 7A and 7B are example representations showing a view changing view states to indicate a focus change, which may include animating views' position changes, according to one or more example implementations.
Figure 7B:
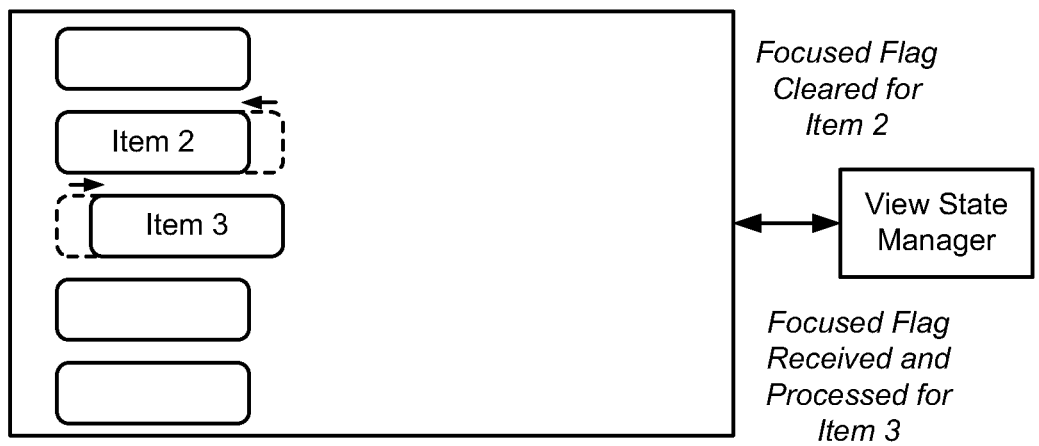

FIGS. 7A and 7B show how the focus flag may use transitions and animation to change an element's appearance, in this example, item 2 and item 3. In FIG. 7A, the focus flag shifts item 2 to the right, e.g., because its transition (or its parent's override) specifies an "indented" X offset when focused. In FIG. 7B, item 3 gains focus, whereby item 2 is shifted back to X offset zero and item 3 is shifted right "based on the indented" X offset. Note that the animations may be coordinated/merged so as to appear to be simultaneous, although alternatively the animations may be serially performed.

Figure 8A:
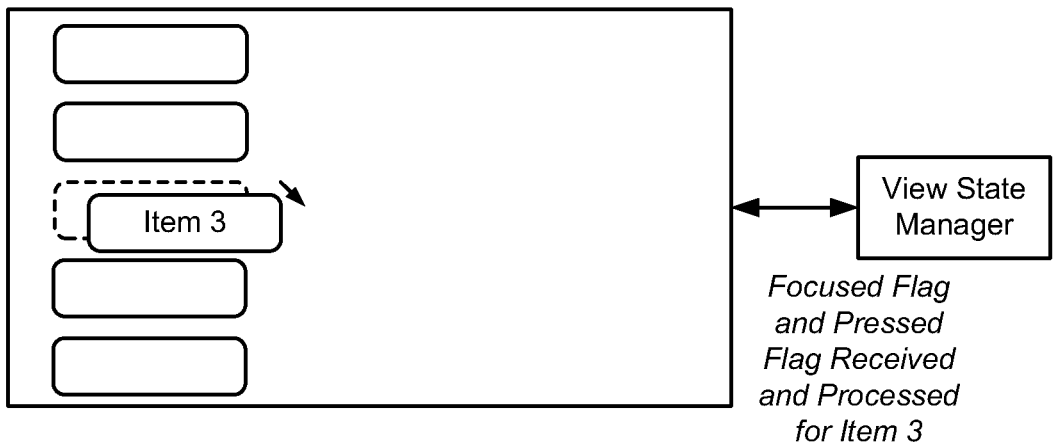
FIGS. 8A-8C are example representations showing a view changing view states to indicate a focus and pressed view state, a focused view state, change, which may include animating views' position changes, according to one or more example implementations.

FIG. 8A shows an example of a menu item 3 that is on screen, Focused, and Pressed. Based on these flags, the view state manager 114 first sets its desired X and Y coordinates and offsets to position the menu item at a correct starting location (the dashed rectangle above and to the left of item 3), because it is on screen; (in this case, the offsets are first zero so as to be on screen in its normal position). As a menu item, its parent view (the menu) may have additional transitions to apply, such as staggering how the child menu item came onto the screen; (however consider that in this example such additional transitions do not apply). Because it is focused, the desired X offset is overridden to move right by some margin (FIG. 8A), and because it is pressed, the desired Y offset is overridden to be down by some margin.

A set of animations is then constructed to transition the menu item from its current values to the new desired values. In this case, the UI element for item 3 will move to the right and down, until it has reached its desired position. The animation may be serial (animate in the X direction then in the Y direction) but typically is coordinated (with some X and Y movement per frame or the like) so as to be perceived as simultaneous.

Figure 8B:
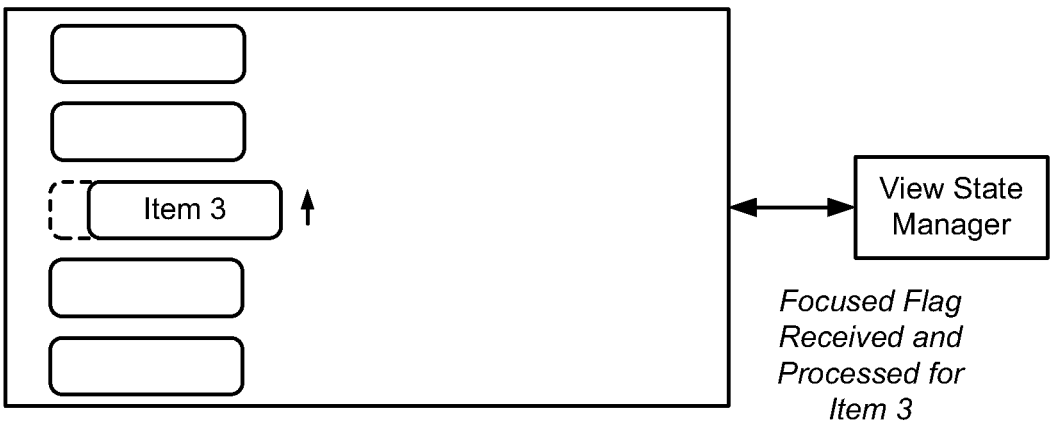

When that view state changes, for example, if the Pressed flag stops being true, the set of transitions is recalculated. In this case, the result generally appears as in FIG. 8B, because the Y offset is not overridden, so it returns to (or remains at) zero. Assuming the menu item had finished its previous transitions before this change occurred, the X offset transition does not result in an animation (because the menu item already has the desired X offset), but there is a transition created to return the menu item to a Y offset of zero.

Figure 8C:
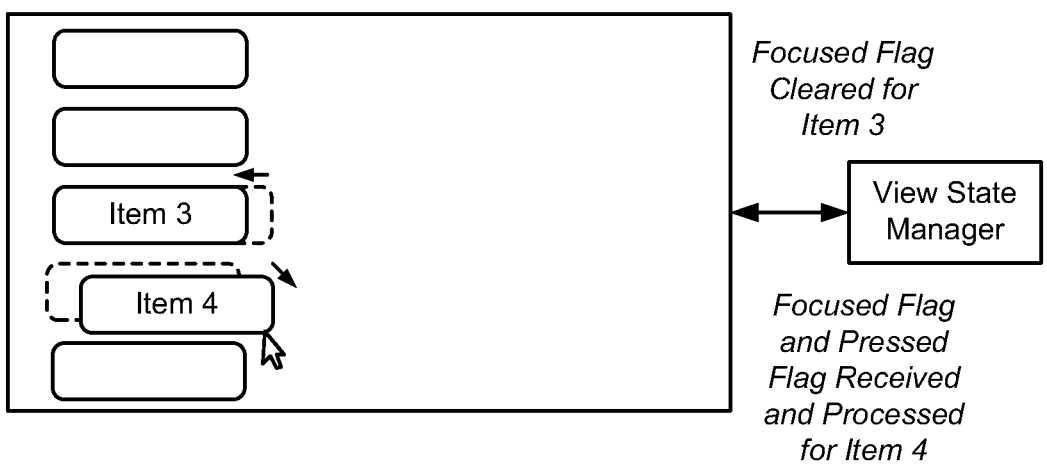

FIG. 8C shows how item 3 transitions back when item 3 had focus but then item 4 receives focus and is pressed, e.g., the user clicks on item 4. In this example, item 3 reverts to zero X offset, and item 4 transitions to a new X and Y offset to move item 4 right and down to indicate the focused, pressed view state.

As can be seen, the result is that as focus moves to and from the menu item, it smoothly transitions left and right to indicate the focus. Similarly, as the user presses down on the menu item, it will move down and back up again when the button is released. These two transitions can be styled independently, and may be merged together to determine which animations need to apply to make the UI element animate correctly for its current state of presence and view state flags.

FIG. 9 is a flow diagram showing example steps that may be taken by a view with respect to a presence state change and/or a view state change. Step 902 represents receiving an event that triggers the change. As is understood, this may be a parent view calling the child view to change its presence state to entering or to exiting. Another event may be related to a set of one or more view state changes, e.g., Focused, Hovered, Listening, Selected, and/or Pressed.

Step 904 evaluates whether the change is a presence state change. If so, at step 906 the view state manager knows the type of state change and uses any transition data for the state change. As described herein, some or all of the transition data may be overridden by a parent view.

Step 908 evaluates whether the change is a view state change. If so, at step 910 the view state manager sets and clears the various ViewState flags appropriately for the view state change, and determines/uses the transitions data for the view state change. Note that a state change such as losing focus may clear the corresponding ViewState flag, and thus the view state manager may act when any flag changes.

Step 912 represents using the rendering data (including any animation data) related to the presence change and/or view state change, e.g., when the view state manager has finished its processing. Step 914 represents rendering the view accordingly, including using any animation over an appropriate number of rendering frames.

Figure 10:
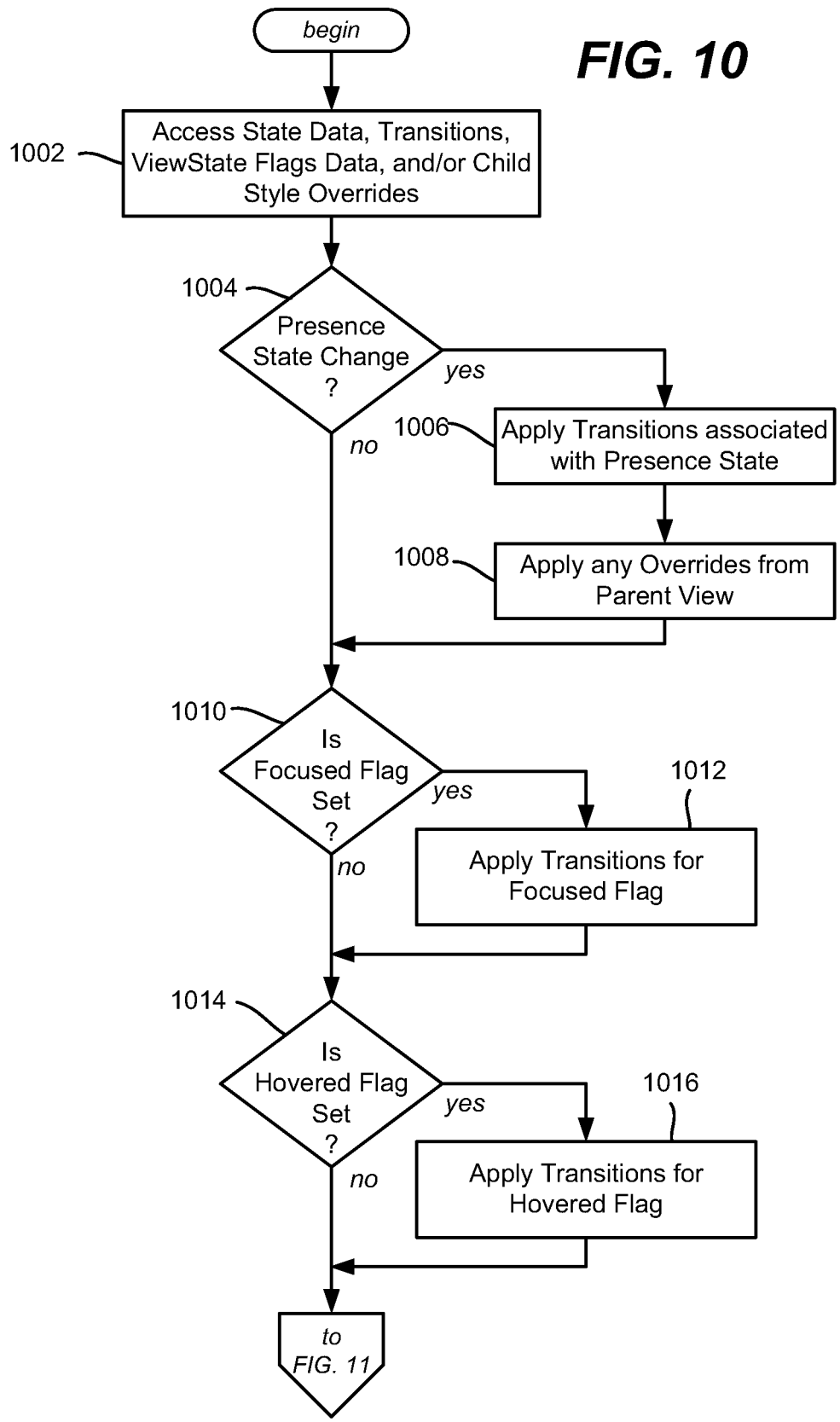
FIGS. 10 and 11 comprise a flow diagram showing example steps related to processing presence state and/or view state information, according to one or more example implementations.
Figure 11:
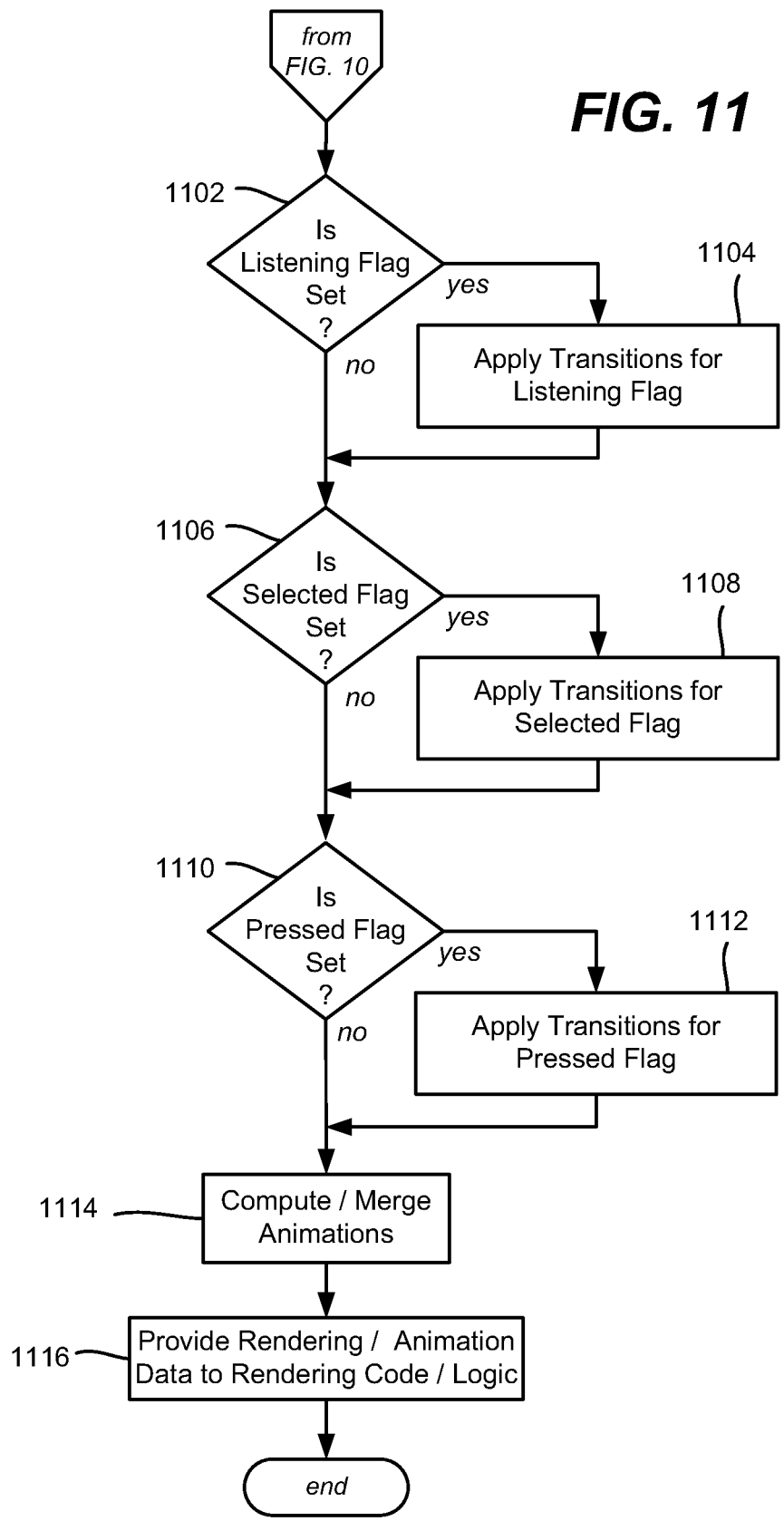
Figure 12:
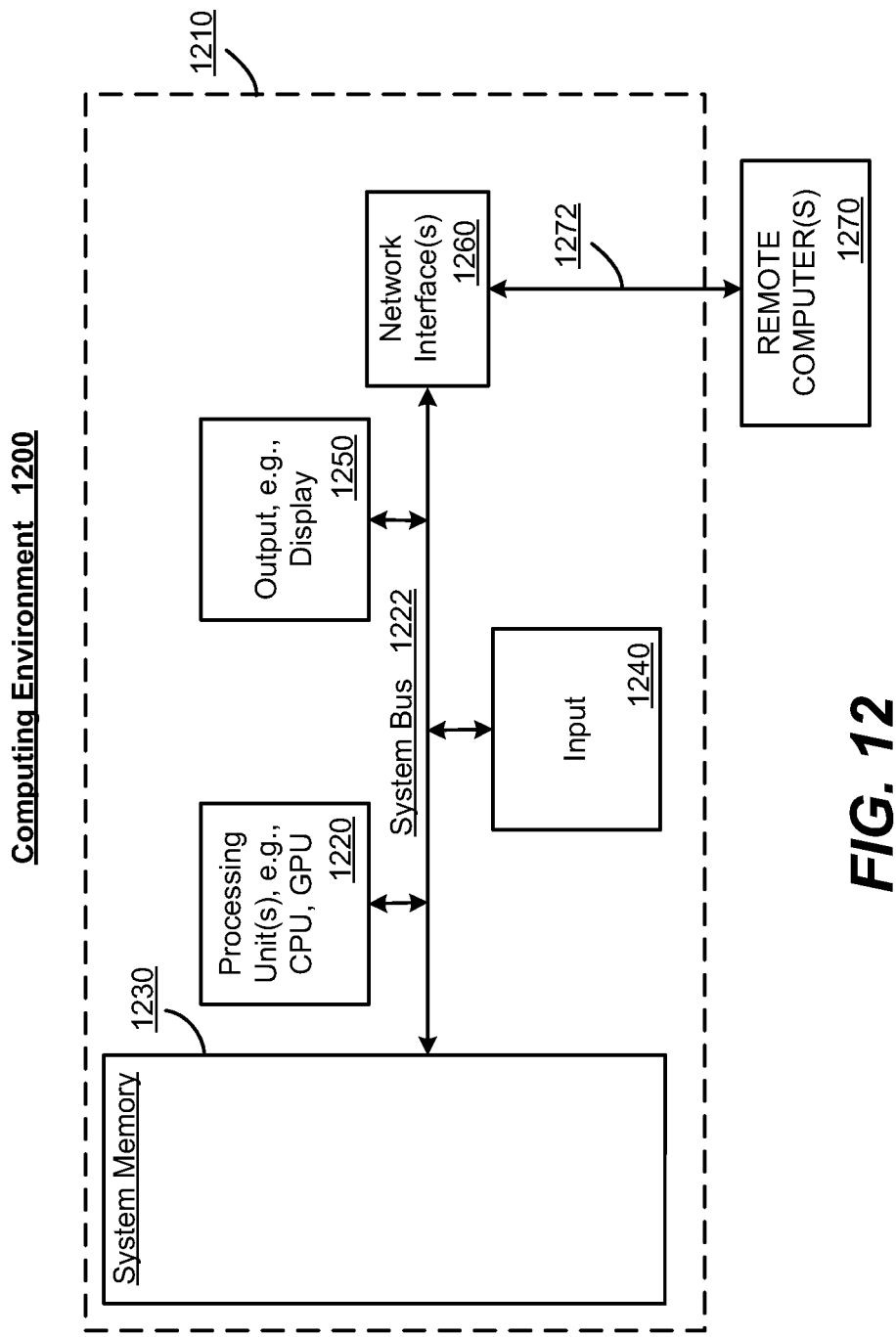
FIG. 12 is a block diagram representing an example computing environment into which aspects of the subject matter described herein may be incorporated.

FIGS. 10 and 11 comprise a flow diagram showing example steps as to how the view state manager may operate in conjunction with the view rendering mechanism to provide styleable transitions as described herein. Step 1002 represents accessing relevant information, which may include state data, transitions, ViewState flags data, and/or child style overrides. Note that if any information is needed, the view state manager may request it, e.g., the parent may be contacted for override data (if not already inherited).

Step 1004 represents evaluating whether the presence state has changed. If so, step 1006 applies any transitions associated with the presence state, e.g., if the view indicates that the state is now exiting, the transitions associated with the exiting state for that view may be used. Any of these transitions may be overwritten by parent view overrides, as represented at step 1008.

Flags are then evaluated in order, beginning at step 1010 for the focused flag, with step 1012 executed if set. Note that there may not be any flags set yet, e.g., if only transitioning the presence state and its associated transitions. Steps 1014 and 1016 operate similarly for hover.

FIG. 11 continues the flag evaluation via steps 1102 and 1104 (listening), steps 1106 and 1108 (selected) and step 1110 and 1112 (pressed). Each transition may overwrite the transitions that applied via a previously set flag. As can be readily appreciated, the steps of FIGS. 10 and 11 provide only one example way to handle state changes. For instance, the flag evaluation order may be changed if a different precedence is desired; additional flags for other ViewStates may be used (e.g., a "watching" state when awaiting gesture input); and not all flags need to be available in a given scenario.

Step 1114 represents computing and merging any animations that are associated with the transitions. Step 1116 represents communicating rendering data to the view rendering mechanism with any animation data, whereby the view renders itself accordingly.

As can be seen, transitions styles describe how a view should enter and exit the scene as well as describe how a view's children should enter and exit the scene. Transition styles also describe how a view should react to changes in view state (being pressed, hovered, focused, and so forth). Transitions can be styled independently on a view, and transitions are merged together to determine which animations need to be run.

One or more aspects are directed towards changing a view from a connected state to an entering state, in which the connected state corresponds to the view being in a view tree and not in a scene, and the entering state corresponds to the view being moved at least partly into the scene. One or more transitions associated with the entering state are determined, and used to determine the appearance of the view entering the scene.

Determining the one or more transitions associated with the entering state may comprise using one or more override styles associated with a parent of the view. At least one override style of the parent of the view may be overridden with an override style of a higher-level parent of the parent.

Using the one or more transitions to determine the appearance of the view in the scene may comprise using animation data to move the view into the scene over a plurality of rendering frames. Using the one or more transitions to determine the appearance of the view in the scene may comprise using at least one transition to vary color, size, position, orientation or opacity.

Upon detecting a change to a view state, one or more view state transitions associated with the view state change may be determined and used to modify the appearance of the view in the scene to represent the view state change. This may include animating the view to represent the view state change. Determining the one or more view state transitions associated with the view state may include obtaining information indicating that the view state corresponds to one or more of: a hovered view state, a focused view state, a listening view state, a pressed view state, or a selected view state. If there are at least two view state transitions, using the view state transitions to modify the appearance of the view may include applying the transitions in a precedence order.

Also described is changing the view from the entering state to an exiting state, which may include determining one or more exiting transitions associated with the exiting state and using the one or more exiting transitions to determine the appearance of the view exiting the scene. Using the one or more exiting transitions to determine the appearance of the view exiting the scene comprises animating the view to move the view out of the scene. The view may be changed from the exiting state to a disconnected state in which the view is not part of a view tree. Alternatively, the view may be reverted from the exiting state to another instance of the entering state.

One or more aspects are directed towards a view associated with a current presence state of a set of possible presence states, in which the current presence state is associated with one or more transitions. A view state manager determines rendering data for the current presence state based at least in part on the one or more transitions associated therewith. The view state manager is coupled to (e.g., internally incorporated into or as an external communicating component) the view to use the rendering data to modify a presentation of the view to a user that is based upon the current presence state. The current presence state may comprises an entering state, and the rendering data may include animation data that is used to transition the view over a plurality of rendering frames into a scene.

Interaction with the view may correspond to a view state change, (e.g., a hovered view state, a focused view state, a listening view state, a pressed view state, and/or a selected view state), and if so, the view state manager determines view state rendering data based upon the view state change, including one or more view state transitions associated therewith. The view state manager is coupled to a view rendering mechanism to use the view state rendering data to modify a presentation of the view. The view state transition may cause an animated visual change to the view to represent the view state change.

One or more aspects are directed towards using one or more styleable transitions to enter a view into a scene, including animating entry of the view into the scene. Upon detecting a view state change, one or more styleable transitions are used to change the appearance of the view based upon the view state change, including animating the appearance of the view to indicate the view state change. One or more styleable transitions are used to exit the view from the scene, including animating the exiting of the view from the scene. Using the one or more styleable transitions to enter the view into the scene may include overriding a styleable transition associated with the view with a styleable transition associated with a parent of the view.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

FIG. 11 thus illustrates an example of a suitable computing system environment 1100 in which one or aspects of the implementations described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more implementations includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine (e.g., computer) readable media and can be any available media that can be accessed by a machine such as the computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor, and
a memory that stores executable instructions that, when executed by the processor, facilitate performance of operations, the operations comprising:
detecting an event related to a change to a state of a view object;
applying at least first and second stylized transitions to the view object;
determining whether the event corresponds to a presence state change to an entering state of the view object;
in response to determining that the event corresponds to the presence state change to the entering state, rendering a first representation of the view object in the entering state;
determining whether the event corresponds to a view state change; and
in response to determining that the event corresponds to the view state change, determining the first stylized transition comprising relevant position and orientation data of the view object;
determining the second stylized transition to be a modified stylized transition based on inherited, de-inherited, overridden or de-overridden data of the view object; and
merging the first stylized transition and the second stylized transition based on the view state change and on the presence state change to the entering state of the view object, and rendering a second representation of the view object based on the modified stylized transition.

2. The system of claim 1, wherein rendering the first representation of the view object in the entering state comprises using animation data to move the first representation of the view object into a scene over a plurality of rendering frames.

3. The system of claim 2, wherein the operations further comprise changing the entering state to an entered state.

4. The system of claim 3, wherein the event is a first event, and wherein the operations further comprise detecting a second event related to another change to the view object, determining that the second event corresponds to a presence state change to an exiting state, and using other animation data to move the view out of the scene over another plurality of rendering frames.

5. The system of claim 1, wherein the event related to the change to the view object corresponds to a view object state change from a first view object state to a second view object state, and wherein the rendering the second representation of the view object based on the modified stylized transition data comprises determining the modified stylized transition data based on inheritance information and override information.

6. The system of claim 1, wherein the event related to the change to the view object corresponds to a view state change to a hovered state, and wherein the operations further comprise determining stylized transition data from hover state-related data associated with the view object.

7. The system of claim 1, wherein the event related to the change to the view object corresponds to a view state change to a focused state, and wherein the operations further comprise determining stylized transition data from focus state-related data associated with the view object.

8. The system of claim 1, wherein the event related to the change to the view object corresponds to a view state change to a selected state, and wherein the operations further comprise determining stylized transition data from selected state-related data associated with the view object.

9. A method comprising:
maintaining, on a system comprising a processor, first state data associated with a view that indicates the view is in a first view state;
obtaining first style transition data corresponding to the first view state;
rendering a first representation of the view based on the first style transition data;
determining entering state style transition data comprising relevant position and orientation data associated with the view;
determining exiting state transition data comprising the relevant position and orientation data associated with the view;
detecting an event directed to changing the first view state of the view to a second view state of the view;
in response to the detecting the event:
changing the first state data to second state data, comprising maintaining with the view, second state data associated with the view, which second state data indicates the view is in the second view state;
obtaining second style transition data corresponding to the second view state and comprising inherited, de-inherited, overridden or de-overridden data of the view object;
merging the first style transition data and the second style transition data; and
rendering a second representation of the view based on the second style transition data comprising the relevant position and orientation data associated with the view.

10. The method of claim 9, wherein the inherited, de-inherited, overridden, or de-overridden data of the view is based on inherited style transition data from a parent view of the view.

11. The method of claim 10, further comprising using child style transition data associated with the view instead of at least part of the inherited style transition data.

12. The method of claim 11, further comprising overriding at least part of the child style transition data with inherited information based on child style override information associated with the view.

13. The method of claim 9, wherein the obtaining the second style transition data comprises obtaining animation data for rendering the second representation of the view.

14. The method of claim 9, wherein the changing the first state data to the second state data comprises changing at least one of: a non-hovered view state to a hovered view state, a non-focused view state to a focused view state, a non-listening view state to a listening view state, a non-pressed view state to a pressed view state, or a non-selected view state to a selected view state.

15. The method of claim 9, wherein the maintaining the second state data comprises maintaining a dataset associated with the view, the dataset including at least two of: a focused flag, a hovered flag, a listening flag, a selected flag, or a pressed flag.

16. The method of claim 15, wherein an ordering of the second state data determines the second style transition data when two or more flags in the dataset are set to indicate two or more view states.

17. A non-transitory machine-readable storage medium, comprising executable instructions that, when executed by a processor, facilitate performance of operations, the operations comprising:
rendering a representation of a container, the container comprising a parent view object of a child view object;
rendering, within the representation of the container, a first representation of the child view object in a first view state, the rendering the first representation based on first stylized transition data associated with the first view state, in which at least part of the first stylized transition data is inherited from the parent view object;
determining entering state transition data comprising first relevant position and orientation data associated with the child view;
determining exiting state transition data comprising second relevant position and orientation data of the child view;
detecting a view state change from the first view state to a second view state;
merging the first stylized transition data and second stylized transition data based on the view state change; and
in response to the view state change, rendering, within the representation of the container, a second representation of the child view object in a second view state, comprising entering the second representation of the child view object in the second view state based on the first relevant position and orientation data associated with the child view, animating the rendering of the second representation based on the second stylized transition data associated with the second view state, wherein the second stylized transition data comprises the relevant position and orientation data associated with the child view and wherein at least part of the second stylized transition data is inherited, de-inherited, overridden or de-overridden data of the child view object, and exiting the second representation of the child view object in the second view state based on the second relevant position and orientation data associated with the child view.

18. The non-transitory machine-readable storage medium of claim 17, wherein the merge operations comprises combining stylized transition data inherited from the parent view object with child stylized transition data associated with the child view object to obtain the second stylized transition data.

19. The non-transitory machine-readable storage medium of claim 17, wherein the operations further comprise changing a state of the parent view object to an entering state, transitioning the parent view object from the entering state to an entered state, and wherein the rendering the representation of the container comprises animating the rendering of the representation of the container while transitioning the parent view object from the entering state to an entered state.

20. The non-transitory machine-readable storage medium of claim 17, wherein the operations further comprise changing a state of the parent view object to an exiting state, and animating a re-rendering of a re-rendered representation of the container while in the exiting state.

* * * * *